United States Patent

[11] 3,590,293

| | | |
|---|---|---|
| [72] Inventor | Robert A. Susdorf<br>Fort Wayne, Ind. | |
| [21] Appl. No. | 867,115 | |
| [22] Filed | Sept. 29, 1969 | |
| [45] Patented | June 29, 1971 | |
| [73] Assignee | General Electric Company<br>Continuation-in-part of application Ser. No.<br>636,507, May 5, 1967, now abandoned. | |

[54] DYNAMOELECTRIC MACHINE HAVING A STATIONARY ASSEMBLY OF THE PERMANENT MAGNET TYPE
5 Claims, 6 Drawing Figs.

[52] U.S. Cl. ............................................. 310/154, 310/182
[51] Int. Cl. ..................................................... H02k 21/26
[50] Field of Search........................................... 310/177, 154, 185, 152, 46, 140, 218, 258, 255, 182, 186

[56] References Cited
UNITED STATES PATENTS

| | | | |
|---|---|---|---|
| 2,968,755 | 1/1961 | Baermann ..................... | 310/46 |
| 3,296,471 | 1/1967 | Cochardt. ....... | 310/154 |
| 3,426,224 | 2/1969 | Esters . ..... ..... .... | 310/154 |
| 3,452,230 | 6/1969 | Pearson... ..... .... | 310/180 |

*Primary Examiner*—D. F. Duggan
*Assistant Examiner*—R. Skudy
*Attorneys*—John M. Stoudt, Radford M. Reams, Ralph E. Krisher, Jr., Frank L. Neuhauser, Oscar B. Waddell and Joseph B. Forman ABSTRACT: A dynamoelectric machine incorporating permanent magnet stationary structure capable of use requiring fast electrical response and acceleration rates, such as peripheral computer and machine tool applications. The magnetic poles of the stationary structure include at least two permanent magnets in series circuit relation of different magnetic characteristics and size having a flux shunt therebetween to develop high flux densities in the airgap, to permit good dissipation of heat from the poles, and to attain generally balanced high energy operation. The stationary structure also includes a single short-circuited winding adjacent the bore tending to linearize acceleration of the machine.

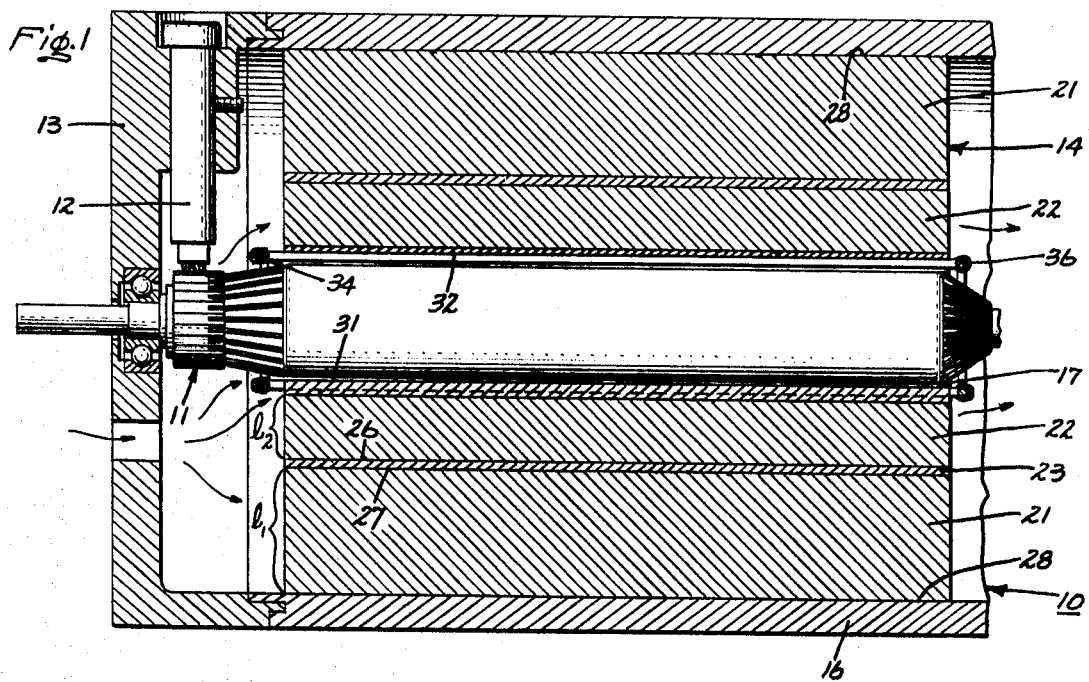
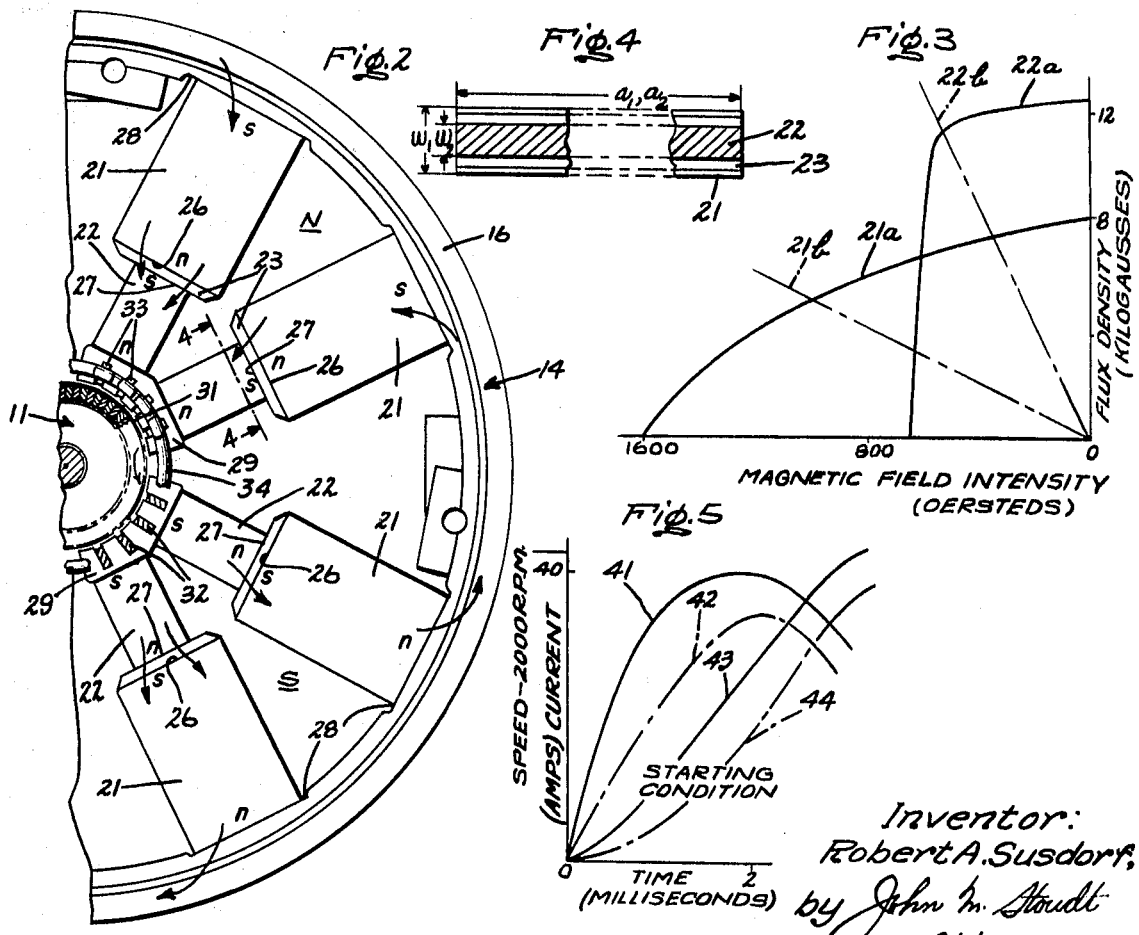

PATENTED JUN 29 1971

INVENTOR.
Robert A. Susdorf,
BY Ralph E. Krisher Jr.
Attorney.

3,590,293

DYNAMOELECTRIC MACHINE HAVING A STATIONARY ASSEMBLY OF THE PERMANENT MAGNET TYPE

Cross-Reference to Related Applications

This is a continuation-in-part application of my copending application Ser. No. 636,507 filed May 5, 1967, now abandoned.

BACKGROUND OF THE INVENTION

The present invention relates to a dynamoelectric machine having a stationary assembly with permanent magnet excitation structures and in particular to an improved direct current type dynamoelectric machine of the kind having permanent magnets in the magnetic poles.

In recent years, direct current type dynamoelectric machines having permanent magnet stators have been employed in applications where exacting fast electrical and repeated acceleration rates are important, such as single-capstan tape transports and other peripheral computer applications. For these applications, it is quite desirable for the machines to incorporate easily manufactured magnet excitation stationary structure which operate at high flux densities and magnetomotive forces (m.m.f.) to develop resulting high airgap flux densities. It is also desirable that the permanent magnet stationary structure not unnecessarily add either weight or size to the machine, yet be capable of allowing satisfactory heat dissipation to occur from the armature assembly and other enclosed components, especially in light of the heat generating potential of the machine. However, these results should be obtained in a machine which may be operated with performance characteristics of the type permitting its use in the kind of applications previously mentioned.

Accordingly, it is the primary object of the present invention to provide a dynamoelectric machine with an improved stationary assembly of the permanent magnet type. It is a more specific object to provide such a machine which achieves at least some of the desirable features mentioned above.

It is a further object of the present invention to provide an improved dynamoelectric machine with permanent magnetic structure which does not add unnecessary weight and size to the machine, yet permits efficient cooling of heat generating components, and at the same time produces improved operating characteristics.

SUMMARY OF THE INVENTION

In carrying out the invention in one form, I provide an improved dynamoelectric machine having a permanent magnet stationary excitation structure. At least two permanent magnets of different magnetic characteristics and size having a flux shunt therebetween are mounted in series magnetic circuit between the yoke and bore of the machine. The radially innermost permanent magnet, e.g., the permanent magnet located nearer to the axis of rotation or adjacent the bore, in the series circuit of a magnet pole has a higher flux density and is of less cross section area than the other permanent magnet in the same pole. In order to derive a generally balanced high energy economical operation for the machine, the flux densities of the permanent magnets differ approximately as the inverse of their individual cross section minimum areas. In addition, the stationary structure carries a short-circuited winding adjacent the bore, inwardly of the innermost permanent magnet, which tends to aid in linearizing the acceleration characteristics of the machine.

The foregoing construction is not only economical to manufacture, but further tends to prevent the addition of unnecessary weight and size to the machine for a given desired performance. It also produces improved operating characteristics for a given size machine, especially in the development of high airgap densities, while permitting effective heat dissipation from the armature assembly and from the vicinity of the permanent magnet series circuit.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

BRIEF DESCRIPTION OF THE DRAWINGS

FIG. 1 is a cross-sectional view, partly in full and partly broken away, of a dynamoelectric machine embodying the preferred embodiment of the present invention;

FIG. 2 is a partial end view of the machine shown in FIG. 1 as seen from the left side of that Figure with the end frame removed to show details of the stationary member having a permanent magnet polar structure;

FIG. 3 shows specific examples of flux density vs. magnetic field intensity characteristics for one type of permanent magnet polar stationary structure in the embodiment shown in FIGS. 1 and 2;

FIG. 4 is a view taken along line 4—4 in the direction of the arrows in FIG. 2;

FIG. 5 shows peak current plotted against time under initial starting conditions for the machine of the exemplification.

DESCRIPTION OF THE PREFERRED EMBODIMENTS

Figure 6:
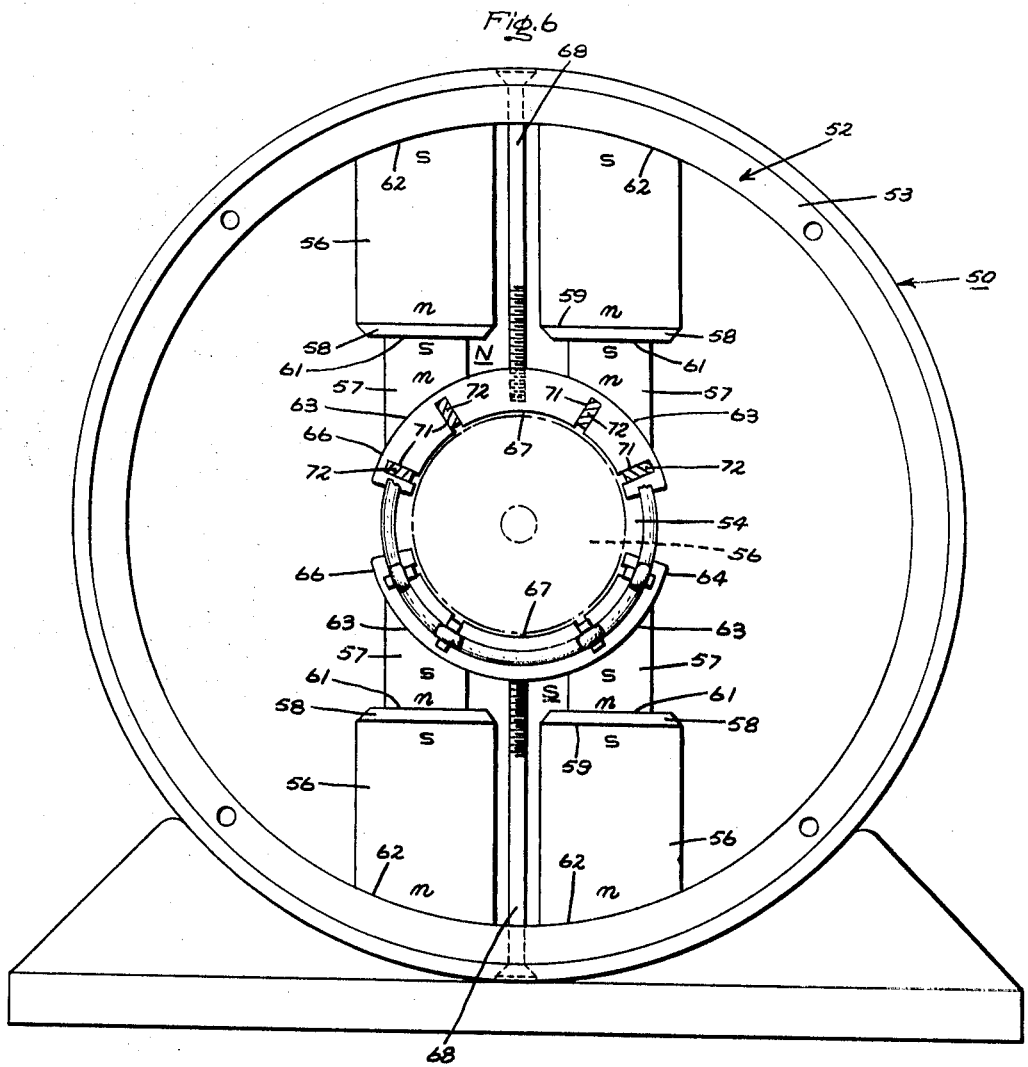
FIG. 6 is an end view of another dynamoelectric machine embodying the present invention, with an end frame removed to show details of another stationary member having a permanent magnet polar structure.

Turning now to the drawings in more detail, the form of the present invention is illustrated as being incorporated in a four pole direct current dynamoelectric machine 10 of the type capable of use for fast response and rapid acceleration applications, for instance, peripheral computer applications. For purposes of disclosure, the illustrated rotatable armature assembly 11, brush assembly 12, and end frame assemblies 13 (one being shown in FIG. 1) of the machine are similar in construction to those disclosed more fully in U.S. Pat. No. 3,465,186 of Robert Susdorf and Fredrick Armstrong which issued Sept. 2, 1969, and is assigned to the same assignee as the present invention.

The stationary assembly or member in the exemplification, denoted generally by numeral 14 in FIGS. 1 and 2, has an outer high permeable magnetic shell or housing 16 which serves as the yoke of assembly 14. Between the yoke and bore 17 of the stationary structure which receives the rotatable assembly, there is furnished a number of magnetic poles (four in the exemplification) of alternate polarity denoted by upper case letters "N" and "S" in FIG. 2. Each pole comprises at least two permanent magnets 21, 22 magnetically connected in series circuit relation with their respective poles oriented generally in the same direction and noted by letters "n" and "s." A magnetic flux shunt 23 fabricated of solid magnetic material such as steel is mounted between generally planar pole faces 26, 27 of the respective magnets to facilitate efficient passage of flux between the magnets.

In order to provide the planar surfaces which face each other, the illustrated permanent magnets are of blocklike construction. The radially outward pole flat faces, i.e., the faces of magnets 21 further from the bore 17, are attached to lands 28 of the yoke while the radially inward faces, i.e., the faces of magnets 22 nearer to the bore 17, are connected to magnetic flux shunts 29, which have arcuate surfaces 31 forming bore 17. A thin layer of cured epoxy resin, such as Epon 929 or other suitable adherent material which allows the passage of flux therethrough, may be employed to connect the components of the series magnetic circuit together. Although two series magnetic circuits in parallel relation are shown per pole, one may be used if desired.

These radially inner flux shunts are near the bore and, in effect, are polar regions located adjacent the rather small airgap, defined between the outer periphery of the armature assembly 11 and arcuate surfaces 31 which carry electrical conducting bars 32 (e.g. copper, aluminum or the like) accommodated in slots 33. The bars extend entirely through the shunts in the axial direction, and are electrically joined together at the respective axial ends of the magnetic poles by rings 34, 36 to form a single short-circuited squirrel cage winding in the vicinity of the airgap. In operation, this winding induces currents in opposition to field changes resulting from changes in armature current without increasing armature resistance. It thus tends to minimize armature inductance to that approaching self inductance in air, and improves linear accelerating and commutation characteristics for the machine.

Turning now more specifically to a consideration of permanent magnets 21 and 22 which are polarized radially in the same magnetic series circuit, the arrangement develops high airgap densities economically for a given size machine, yet permits effective dissipation of heat in the vicinity of the magnetic series circuit, next to the heat generating armature assembly and the squirrel cage winding. In particular, permanent magnet 22, positioned radially nearer the bore, is formed of magnetic material having a flux density greater than that of magnet 21. Magnet material for magnets 21, 22, such as that disclosed in the General Electric Permanent Magnet Manual No. PM-200, may be employed. In an inverse manner, the minimum cross section area ($A_2$) of magnet 22 disposed next to the bore is less than the minimum cross section area ($A_1$) of magnet 21. This construction provides unobstructed regions axially through the stationary structure in the vicinity of the armature assembly and short-circuited winding, even in four pole constructions and above, especially between magnets 22, to facilitate transfer of heat away from the heat generating machine components. Further, it is possible to derive generally balanced high energy operation for the machine by providing the ratio of the flux densities for the serially connected magnets in an approximately inverse manner to the ratio of their minimum cross section areas $A_1/A_2$ and still retain the good heat dissipating advantages.

By way of illustration, in actual practice a machine was constructed with four magnetic poles as shown in the drawing in which permanent magnets 21, 22 were respectively cast Alnico 8 and 5, commercially available from the General Electric Company, having the flux density-magnetic field intensity characteristics revealed by curves 21a, 22a in FIG. 3. Magnet 21 additionally had a maximum energy-product (at the intersection of permeance line 21b and curve 21a) of 5.2 kilogausses at 950 oersteds while magnet 22 included a maximum energy product (intersection of curves 22a, 22b) of 10.0 kilogausses at 550 oersteds. The machine included the following nominal dimensions (in inches):

Diameter of assembly 11   1.623
Bore 17 diameter
Diameter of stationary assembly   8.5
Airgap width   0.015
Axial length $a_1$, $a_2$ of magnets 21, 22   8.5
Radial length $l_1$ of magnet 21   1.7
Radial length $l_2$ of magnet 22   0.9
Radial length of magnetic shunt   0.1
Width $W_1$ of magnet 21   1.2
Width $W_2$ of magnet 22   0.6

Angular distance of magnetic poles N,S was 144 electrical degrees. Thus, the magnet flux density ratio of 5.2/10.0 for magnets 21, 22 was approximately one-half, the inverse of the ratio of their cross-sectional areas (1.2×8.5/0.6×8.5 or in the order of a 2 to 1 relationship).

When tested, the machine developed unusually high airgap flux densities in the neighborhood of 55,000 lines per square inch or 8.6 kilogausses. Further, the exposed flat sides of the serially connected magnets and flux shunts furnished sufficient space axially through the structure to permit effective dissipation of heat adjacent the squirrel cage winding and armature assembly when cooling fluid, such as air, was drawn or forced axially through the machine thereby permitting satisfactory operation at elevated temperatures (in excess of 155° Centigrade). Moreover, the desired ampere-turns for the excitation structure, as determined by the sum of $l_1$, $l_2$, for the magnets as well as space utilized for the structure and machine weight were readily controlled. The machine was also capable of fast electrical response (curve 41 in FIG. 5) and generally linear acceleration rates (curve 43). This rapid response becomes even more significant when compared with that shown by curve 42 which is typical of a machine of the same size incorporating a single permanent magnet in series circuit between the yoke and bore and employing no short-circuited winding. Curve 44 reveals the acceleration characteristics for this machine. The machine incorporating the invention was capable of satisfactory use in applications requiring fast electrical and repeated fast acceleration rates. Consequently, by proper selection of permanent magnet material and sizes, maximum utilization of weight, space, and performance, including heat dissipation can be economically attained by use of the present invention. Thus, a machine including the invention may be employed even for such demanding applications as peripheral computer and tool machine applications.

In FIG. 6, there is shown another embodiment of the present invention in which a dynamoelectric machine 50 incorporating another form of the invention, is illustrated with some parts removed and other parts broken away for purposes of clarity. A rotatable armature assembly 51 of the machine, shown in broken lines, is substantially similar to the armature assembly 11 fully described above. In addition, suitable frame assemblies (not shown), such as the previously described frame assemblies 13 of FIG. 1, support the rotatable armature assembly 51.

The stationary assembly or member denoted generally by numeral 52 in FIG. 6, has an outer shell or housing 53 of high magnetic permeability which also serves as the yoke of assembly 52. Between the yoke and bore 54 of the stationary structure which receives the rotatable assembly, there are two magnetic poles denoted by the upper case letters "N" and "S." Each pole comprises at least two permanent magnets 56, 57 magnetically connected in series circuit relation with their respective magnetic poles oriented generally in the same direction and denoted by the letters "n" and "s." Like the first embodiment, a magnetic flux shunt 58, fabricated of magnetic material such as steel, is mounted between generally planar pole faces 59, 61 of the respective magnets to facilitate the efficient passage of flux between the magnets.

The radially outward faces 62 of the magnets 56, i.e., the faces further from the bore 54 are nonplanar and engage the yoke 53 while nonplanar radially inward faces 63 of the magnets 57, i.e., the faces nearer the bore 54, are connected to magnetic flux shunts 64 which each have an arcuate surface 66 engaged by the magnets 57 and an arcuate surface 67 forming bore 54. A suitable adherent material as described above in the description of the first embodiment may be used to connect magnets 56, 57 and shunts 61, 64 together. The series connected magnets and shunts have been illustrated as being secured to the yoke 53 by suitable screws 68 which are threaded into tapped holes in the shunt 64 and thereby clamp the shunts and magnets to the yoke. It will, however, be understood that the aforementioned adherent material may be used to secure the entire magnetic assembly to the yoke rather than the illustrated screws. In addition, although two series magnetic circuits in parallel relation are shown per pole, one may be used if desired.

The radially inner flux shunts 64, adjacent to the bore 54, are, in effect, polar regions located adjacent the rather small airgap defined between the outer periphery of the armature assembly 51 and arcuate surfaces 67. These surfaces are also each provided with slots 71 which accommodate electrical conducting bars 72. The bars 72 extend entirely through the shunts in the axial direction, and are electrically joined together at the respective axial ends of the magnetic poles by not shown rings similar to the rings 34, 36 of FIG. 1 to form a single shortcircuited squirrel cage winding in the vicinity of the airgap 54. During operation, this winding induces currents in opposition to field changes resulting from changes in armature current without increasing armature resistance. Thus, this winding tends to minimize armature inductance to that approaching self inductance in air, and thereby improves linear accelerating and commutation characteristics for the machine.

The permanent magnets 56, 57 are polarized radially in the same magnetic series circuit between bore 54 and the outer regions of the stationary member 52 in generally the same manner as the magnets 21 and 22 of FIG. 1 and are in effect in radial alignment. Therefore, the magnetic poles of each pair of magnets 56, 57 are oriented generally in the same direction and the magnets are substantially aligned along a radial line extending from the rotational axis of the dynamoelectric machine. The FIG. 6 exemplification develops high airgap densities economically for a given size machine, and yet permits effective dissipation of heat in the vicinity of the series magnetic circuits, next to the heat generating armature assembly and the squirrel cage winding. Permanent magnets 57 are positioned radially nearer the bore and are formed of magnetic material having flux densities greater than that of magnets 56. In an inverse manner, the cross-sectional area of each magnet 57 disposed next to the bore 54 is less than the cross-sectional area of each magnet 56. The magnets 56, 57 may be formed from the same magnetic material used to form the previously described magnets 21, 22. Preferably, the ratio of the flux densities for the serially connected magnets 56, 57 are approximately inversely proportional to the ratio of their cross-sectional areas and the flux density-magnetic field intensity characteristics of these magnets are as previously explained in connection with FIG. 3. This construction includes unobstructed regions axially through the stationary structure in the vicinity of the armature assembly and short-circuited winding and provides the same beneficial features and advantages as previously set forth in regard to the first embodiment.

It should be apparent to those skilled in the art that, while I have shown and described what at present is considered to be the preferred embodiments of my invention, modifications can be made without actually departing from the true spirit and scope of this invention. For instance, more than two permanent magnets having different magnetic and size characteristics may be used in series circuit relation. In addition, the magnets may include configurations other than that shown, for example, they may be trapezoidal in shape, having sides tapering radially and angularly inward.

I claim:

1. A dynamoelectric machine comprising a rotatable assembly; and a stationary assembly having a bore for receiving the rotatable assembly to form an airgap therebetween, and a magnetic circuit including a magnetic yoke for forming a flux path spaced radially outward from the bore, and a number of flux generating magnetic poles disposed between the bore and the yoke; the magnetic poles including at least first and second permanent magnets radially aligned in series magnetic circuit with their respective poles oriented generally in the same direction, with the second permanent magnet when compared to the first permanent magnet, being positioned radially nearer the bore, having a high flux density, and being smaller in cross section.

2. The dynamoelectric machine of claim 1 in which a flux shunt formed of magnetic material is mounted between said first and second permanent magnets to form a radial flux path therebetween.

3. The dynamoelectric machine of claim 1 in which a short-circuited winding is carried adjacent the bore for inducing currents opposing field changes resulting from changes in current of the rotatable assembly tending to aid in linearizing acceleration of the machine.

4. The dynamoelectric machine of claim 1 in which the ratio of flux densities for the first and second permanent magnets is approximately the inverse of the ratio of the areas for the same permanent magnets to provide a generally balanced high energy operation for the machine.

5. A dynamoelectric machine comprising an armature assembly; and a stationary assembly having a bore for receiving the armature assembly to form an airgap therewith and a magnetic circuit including a number of flux generating magnetic poles disposed around the bore, said poles including at least first and second permanent magnets in series magnetic circuit relation, said second permanent magnet being positioned radially inward of said first permanent magnet, and having a higher flux density than said first permanent magnet; said magnetic poles including flux shunts disposed next to the bore, each carrying a number of electrically conductive elements, said elements being electrically joined together adjacent the respective axial ends of the magnetic poles to form a single short-circuited winding for reducing the inductance of the armature assembly.